March 19, 1929.  B. A. WOINA  1,705,799

VEHICLE CLOSURE

Filed May 2, 1927

INVENTOR.
BENJAMIN. A. WOINA.
BY
ATTORNEYS.

Patented Mar. 19, 1929.

1,705,799

UNITED STATES PATENT OFFICE.

BENJAMIN A. WOINA, OF DETROIT, MICHIGAN.

VEHICLE CLOSURE.

Application filed May 2, 1927. Serial No. 188,101.

One of the objects of my invention is to provide a form of vehicle closure which is better adapted to control ventilation of closed vehicles than closures now in common use.

With this and other objects in view, my invention consists in the arrangement, combination and construction of the various parts of my improved device, as described in the specification, claimed in my claims and shown in the accompanying drawings, in which:

Figure 1:
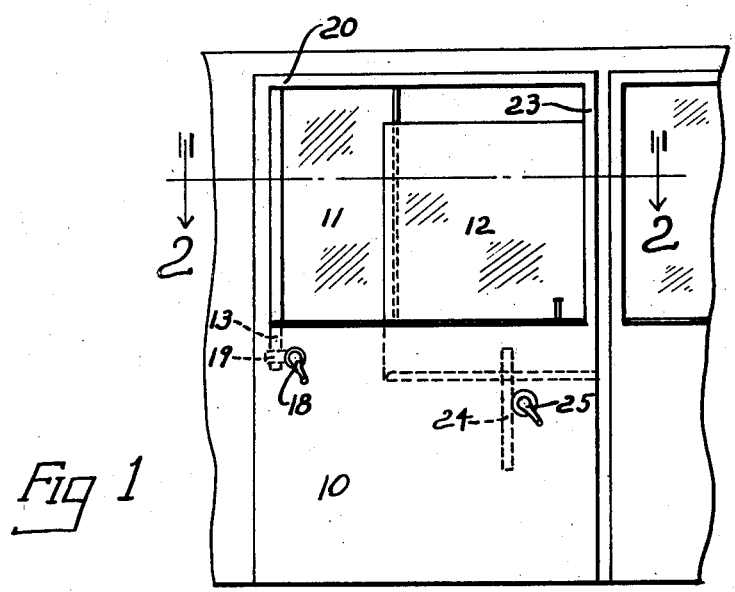
Fig. 1 is an elevation of the inside of a closed vehicle door, illustrating the application of my new device thereto.
Figure 2:
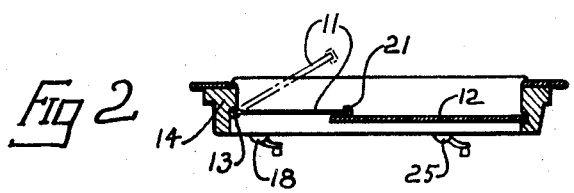
Fig. 2 is a view taken on line 2—2 of Fig. 1.
Figure 3:
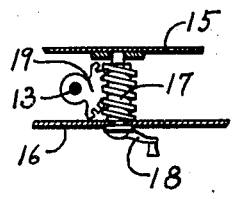
Fig. 3 is one form of control for my new closure.

I have shown a vehicle door 10 having glass panels 11 and 12 disposed in the upper portion thereof. The glass panel 11 is secured at one vertical edge to a vertical post 13 which is movably secured to the front pillar 14 of the door 10. Positioned between the lower panels 15 and 16 of the door 10, adjacent the lower end of post 13 is a worm 17 operated by a handle 18. Secured to the lower end of post 13, Fig. 3, is a tooth sector 19 which meshes with worm 17. The upper end of post 13 is pivotally secured in the door header 20. The rear vertical edge of panel 11 has a windlace member 21 which may be of rubber, secured thereto so that a weather-tight joint may be formed between panels 11 and 12. Operation of the worm 17 by means of the crank 18 will cause the panel 11 to swing outwardly, as shown in the dotted lines in Fig. 2 and it may be adjusted at any angle desired.

The rear edge of the panel 12 is slidable in the channel of the door pillar 23, and between the panels 15 and 16 is positioned any of the usual devices 24, commonly used for raising and lowering window panels in vehicle doors. The device 24 may be operated by a suitable crank 25. The forward edge of panel 12 is positioned to overlap the rear edge of panel 11.

It will be readily understood that the position of the panels 11 and 12 may be changed as desired, for instance, panel 11 may be positioned to close the upper portion of the door with the post 13 pivotally secured to and parallel with the header 20, so that the panel 11 will swing out and up while panel 12 may be made to extend over the width of the opening and slide vertically therein to close the lower portion thereof. It will also be understood that panel 11 may be mounted to swing inwardly if desired.

It will also be readily understood that my device may be fitted to any of the windows of a vehicle and that if desired the smaller windows such as those in the rear quarters and in the back of the vehicle body may, instead of being made stationary or slidable in their frames as is now common practice, be mounted on such a post as 13 operated by such a device as worm 17 and sector 19 so that they will swing in and out of the plane of the vehicle frame for opening and closing, instead of sliding vertically in the plane thereof, and that such windows may be constructed to either swing out and down, out and up, or out and to either side as desired.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. A window for a vehicle body comprising a window casing having a well therein, a panel slidably mounted in said casing and adapted to close a portion thereof, a second panel pivotally mounted in said casing and swingable out of the plane thereof and adapted to engage said slidable panel with its free edge for completely closing said casing.

2. A vehicle body having a windshield mounted in the front portion thereof, doors swingably mounted in the sides thereof, adjacent the ends of said windshield, a pair of panels movably mounted in the upper portions of each of said doors, one of said panels in each door being vertically pivoted to the forward door pillar and swingable outwardly toward the plane of said windshield, the other panel in each door being vertically slidable in the plane thereof.

3. A window for a vehicle body comprising a window casing having a well in the lower portion thereof, a transparent panel mounted to slide vertically in said casing and well and adapted to close a portion of the window opening, a second transparent panel pivotally mounted in said casing adjacent the window opening and swingable to engage a free edge of said first panel for completely closing the window opening.

BENJAMIN A. WOINA.